F. E. GREENWOOD.
APPARATUS FOR DETERMINING MOISTURE.
APPLICATION FILED SEPT. 10, 1920.
1,415,546.
Patented May 9, 1922.
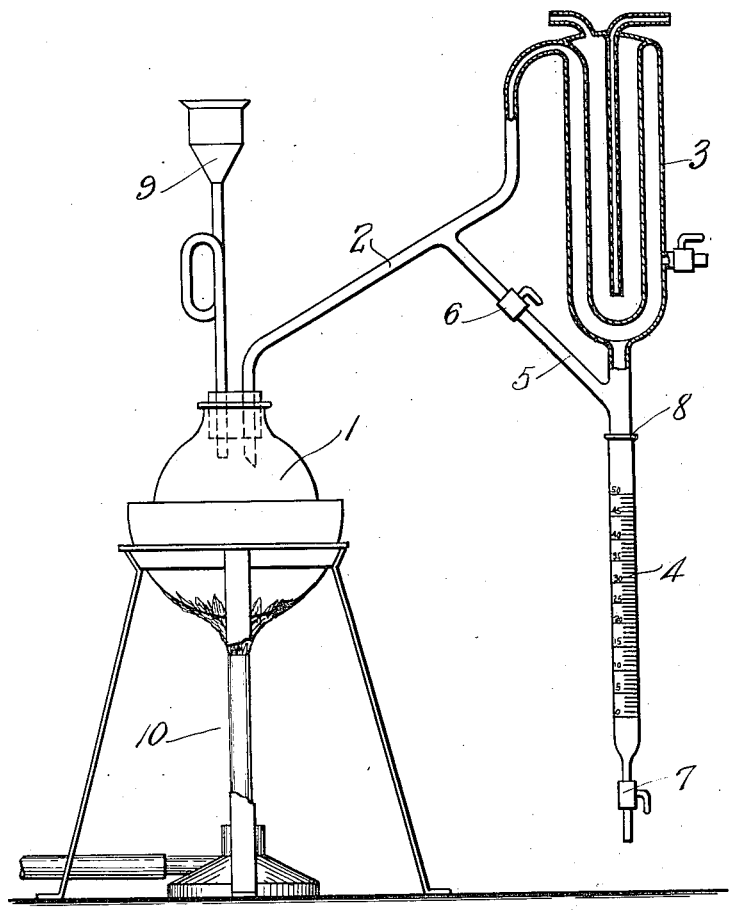
Inventor
Frank E. Greenwood
By his Attorney
E. W. Marshall

UNITED STATES PATENT OFFICE.

FRANK E. GREENWOOD, OF NEW ROCHELLE, NEW YORK.

APPARATUS FOR DETERMINING MOISTURE.

1,415,546.  Registered May 9, 1922.

Application filed September 10, 1920. Serial No. 409,466.

*To all whom it may concern:*

Be it known that I, FRANK E. GREENWOOD, a citizen of the United States, and a resident of New Rochelle, Westchester County, and State of New York, have invented certain new and useful Improvements in Apparatus for Determining Moisture, of which the following is a specification.

My present invention relates particularly to the determination of the moisture content of substances containing a volatile constituent.

The objects of the invention are to provide a simple and practical apparatus for this purpose, which can be easily operated and which will give accurate results.

In the drawing accompanying and forming a part of this specification, I have disclosed one simple form of apparatus by which the invention may be practiced and this with the understanding that the apparatus employed may be modified more or less without departure from the true spirit and scope of the invention as hereinafter defined and claimed.

In the drawing referred to, the single illustration represents a part sectional, and part side elevation view of the apparatus.

This apparatus comprises a still or retort 1 connected by a tube 2 with the upper end of a reflux condenser 3 to the lower end of which there is attached a burette 4.

Also connected with the lower end of the reflux condenser, above the point of attachment of the burette, is an upwardly inclined return tube 5 which connects with the outlet tube 2. A valve or stop-cock 6 is interposed in this return tube.

The burette is shown as graduated and as provided with the usual valve or stop-cock 7 and the burette is further shown as removably connected with the condenser as by means of a ground joint at 8.

A "safety funnel" 9 is shown as connected with the still or extraction flask and a source of heat is indicated in the form of a Bunsen burner at 10.

While, of course, the extraction flask may be of any desired capacity, I have found it convenient for most test purposes to employ a flask of five hundred cubic centimeters capacity and to use a burette graduated in tenths of cubic centimeters.

The invention is particularly adapted for the determination of the moisture content in materials, such as wood, containing considerable quantities of volatile oils. With this apparatus, the amount of water carried in the material is obtained by volumetric measurement as distinguished from the prior uncertain methods of oven drying. The oven drying of such materials as wood, drives off part of the volatiles as well as the moisture, so that the result is incorrect to the extent of the unknown amount of volatile oils lost. In the present invention, all of the substance to be analyzed is retained within the apparatus and there are, therefore, no losses to be reckoned.

In making a moisture determination of a substance containing volatiles, wood for instance, a specified quantity, say one hundred grams, is placed in the flask and covered with a solvent which is immiscible with water and boils at a higher temperature than water. For such a test, I find toluol to be a satisfactory and desirable solvent.

In setting up the apparatus, water is drawn into the burette up to the lowest graduation and the burette and lower part of the condenser are filled with toluol to a point where it starts to flow back into the flask.

On the application of sufficient heat to the flask, the toluol solvent is distilled and carries over with it the moisture in the substance under treatment. The water and the solvent are both condensed in the condenser and the water being the heavier, settles to the bottom and, therefore, falls into the burette.

During this operation, the stop-cock 6 in the return tube 5 is left open so that the condensed toluol and that displaced by the water, passes up through the return tube and back into the flask to be again distilled and carry over more water.

Distillation is continued until no more water is carried over with the solvent. The cubic centimeters of water standing in the burette are then a direct indication of the moisture content of the substance, each cubic centimeter representing in the instance given, (where one hundred grams of substance were treated) one per cent of the original weight.

The moisture is thus separated as distilled water and directly measured; the original total and the extracted moisture then being known, the proportion of one to the other is readily ascertainable.

Upon completion of the moisture determination, the water may be drawn from the burette by way of the stop-cock 7 and the toluol in the condenser and burette may be then drawn off and saved for future use. To recover the toluol in the flask, which will contain some of the solubles in the original substance, the burette is removed, the stop-cock in the return pipe is closed, and distillation is carried on to an extent sufficient to collect the toluol in the condenser.

It will be noted that the apparatus operates on a closed circuit so that nothing is lost and further, that the operation is a continuous one, a portion of the extracted moisture being condensed and "trapped" in the burette in each cycle of flow of the solvent.

What I claim is:—

1. Apparatus for the determination of moisture content comprising an extraction flask, a reflux condenser, a conduit from the extraction flask to the upper portion of the condenser, a return connection from the lower part of the condenser to the extraction flask and a measuring receptacle connected with the condenser at a point below the return connection.

2. Apparatus for the determination of moisture content comprising an extraction flask, a reflux condenser, a conduit from the extraction flask to the upper portion of the condenser, a return connection from the lower part of the condenser to the extraction flask, a measuring receptacle connected with the condenser at a point below the return connection and a valve in the return connection.

In witness whereof, I have hereunto set my hand this 8th day of September, 1920.

FRANK E. GREENWOOD.